July 20, 1943.  S. STROBL  2,324,603
COMBINATION TOOL HOLDER FOR LATHES
Filed Nov. 18, 1940   2 Sheets-Sheet 1
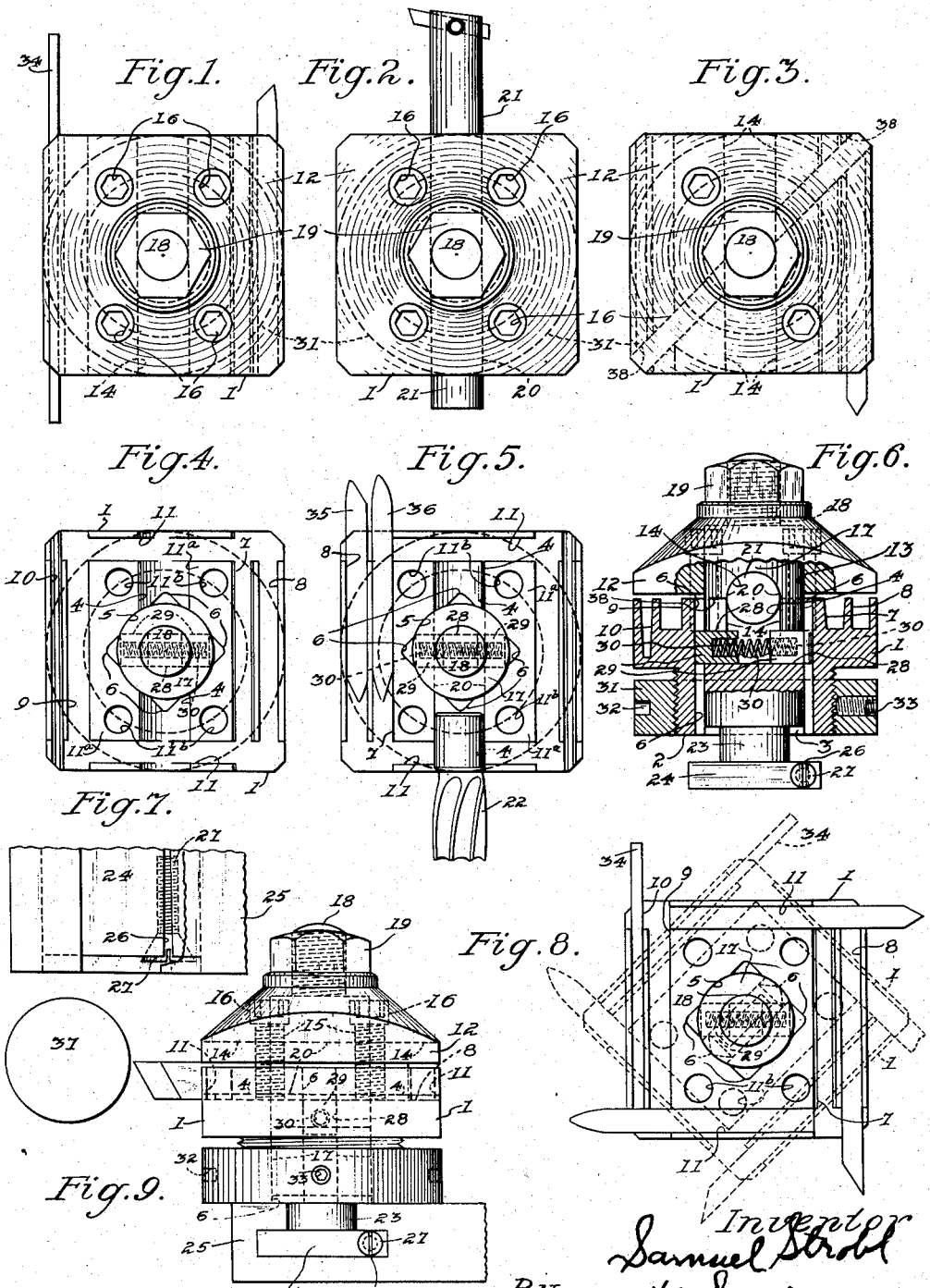

July 20, 1943.　　　　S. STROBL　　　　2,324,603
COMBINATION TOOL HOLDER FOR LATHES
Filed Nov. 18, 1940　　　2 Sheets-Sheet 2

Inventor
Samuel Strobl
By H.J. Sanders
Atty.

Patented July 20, 1943

2,324,603

UNITED STATES PATENT OFFICE 2,324,603

COMBINATION TOOLHOLDER FOR LATHES

Samuel Strobl, Chicago, Ill.

Application November 18, 1940, Serial No. 366,081

3 Claims. (Cl. 29—48)

This invention relates to certain new and useful improvements in combination tool holders for lathes. The primary object is to provide a tool holder adapted to hold all necessary tools for ordinary turning, boring, external and internal thread cutting, for cutting-off operations, etc. A further object is to provide a tool holder that operates without the use of the well known tool post or the conventional rocker.

The elimination of the rocker and the substitution therefor of a positively operated adjustment ring to enable the operator to adjust the tool bit to the center of the work provides a very sturdy base for the tool bit to rest upon and free from overhang, thus assuring more accurate work. A still further object is to provide in combination a right, left, and straight tool cutter; a boring bar holder, a threader, cutter, and a knurling tool holder.

A still further object is to provide a tool holder that when once the tool bit is adjusted to the center of the work this adjustment need not be changed when other tool bits are inserted or one tool substituted for another. The tool holder also receives and firmly holds a square type of tool bit as well as form cutters of various shapes.

This tool holder will conveniently and positively hold one, two, three, four or more tool bits at one and the same time thus reducing the stock with greater speed. A still further object is to provide a tool holder wherein the tool bits cannot slip due to their positive engagement and support upon the solid base thus permitting a heavier and deeper cut to be taken with safety and accuracy. Demonstration and use have shown that two inches of mild steel may be removed with one cut. This is due to the fact that no rocker is used and the tool bit is supported directly on a solid base and the bit is supported throughout the length of the holder in a positive manner and is held close to the work without unnecessary overhand. The cutting off blade is held firmly by the full width of the holder and will cut within one-eighth inch from the chuck jaws. A further object is to provide a combination tool holder wherein a boring bar is rigidly gripped and a knurling tool positively held. The holder is adapted also to hold high speed end mills which can be used for recessing instead of using a boring bar for that purpose.

The tool holder operates without the use of set screws which, in conventional tool holders, often cause brand new bits to crack. With the foregoing and other objects in view the invention consists in the combination and arrangement of parts to be hereinafter fully described, pointed out in the claims and illustrated in the accompanying drawings, in which—

Fig. 1 is a top plan view of the tool holder provided with a cut-off blade and a bit held for right hand turning.

Fig. 2 is a similar view showing the tool holder carrying a boring bar for inside threading and boring, the tool bit being reversible, the holder positively supporting the tool and together therewith being disposed in a direct line with the work and not offset therefrom.

Fig. 3 is a top plan view of a slightly modified form of the holder provided with a tool.

Fig. 4 is a top plan view of the holder bed with the head removed.

Fig. 5 is a view similar to Fig. 4 but with the bed turned half way around showing two tools, one for rough cut and one for finishing, and also holding an end mill.

Fig. 6 is a view of the tool holder shown in Fig. 3 but partly in elevation and partly in central vertical section showing the construction more clearly.

Fig. 7 is an enlarged fragmentary plan view of the lathe-engaging foot.

Fig. 8 is a plan view similar to Fig. 5 but showing two positions of the bed.

Fig. 9 is a view of the tool holder in elevation provided with a tool and mounted on the lathe carriage, the work being here also shown.

Like reference characters denote corresponding parts throughout the several views.

Figure 10:
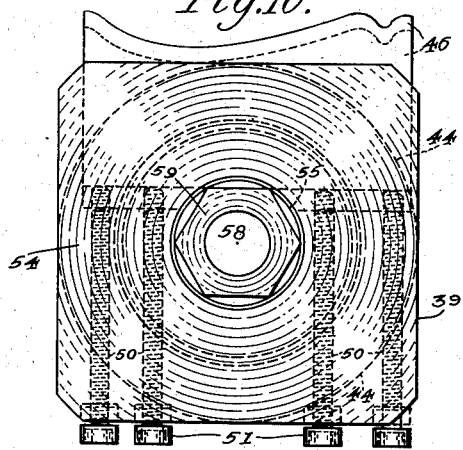
Fig. 10 is a top plan view of a modified form of holder provided with a cutting tool.

Referring now to Figs. 1 to 9 inclusive, the tool holder includes a bed 1 formed with a reduced portion 2, said bed proper being preferably square or oblong in horizontal cross section while the stem or reduced portion 2 is round in horizontal cross section and is threaded exteriorly. The bed and stem are preferably of integral formation and are formed with a central bore 3. The bed is formed centrally and transversely of its upper face with elongated recesses 4, said recesses extending inwardly from opposite edges of said bed to a large central perforation 5 which is somewhat diamond shaped with its corners 6 ninety degrees apart and two of said corners cutting centrally into the said recesses 4 which latter recesses are substantially semi-circular from side to side.

Spaced to one side of the central recesses 4 are the parallel recesses 7, 8 spaced apart and extending across the bed, the lateral walls of recess 7 converging slightly from its mouth to its base, said recess 8 being square. Spaced from the opposite side of said central recess is a recess 9 identical with the recess 8 and spaced outwardly from said recess 9 is the relatively narrow and deep recess 10 parallel to the recess 9 and with its walls tapering inwardly from top to base.

Disposed at right angles to and meeting the said recesses 7, 9 and extending along opposite edges of the bed are the parallel straight-side recesses 11 that together with said recesses 7, 9 define an integral central oblong table portion 11a of the bed 1 wherein threaded wells 11b, preferably four in number are formed. A head 12 adapted to seat upon a standard 17, described hereinafter, is beveled upon its upper side and formed centrally with a perforation 13 contracted at its upper end to form a non-threaded screw-receiving opening, said head being formed with opposing recesses 14.

The recesses 14 extend transversely and centrally from opposite lateral edges to said perforation 13, said recesses 14 being complementary to said bed recesses 4, said head being formed also with non-threaded perforations 15 to receive the screws 16 the shanks of which are received in the said threaded wells 11b in the table portion of the bed 1.

A standard 17 of round cross section throughout its body portion is formed with a reduced threaded stem 18 that extends through said head and receives the nut 19, said standard proper being received in the central perforated portion of said head and bed and fitting snugly in said head perforation while being of a diameter something less than the diameter of the central perforation 5 of said bed. A round perforation 20 in said standard registers with the recess 4 of said bed and 14 of said head to receive a boring tool 21 or high speed end mill 22. The lower end of said standard is reduced to form the neck 23 that terminates in the oblong foot 24, said neck and foot being adjustably received in the carriage of the lathe 25, said foot being formed with a slot 26 at one end, said slot being threaded to receive the actuating screw 27 that, when driven slightly into said slot, expands the slotted end of the resilient foot to lock it firmly in an adjusted position in the lathe.

Extending through said standard 17 between the perforation 20 and the neck 23 is the square perforation 28 that snugly, adjustably and removably receives the opposed index fingers 29, two in number, having narrow or pointed free ends, the inner or heel ends thereof being recessed to receive the ends of the expansion spring 30 that yieldingly forces said fingers the maximum distance apart. Arranged upon the threaded reduced portion 2 of the bed 1 is the threaded adjusting ring 31 formed with notches 32 peripherally to receive an actuating pin, not shown, and with a threaded perforation to receive the headless screw 33 for engagement with the threads of the reduced bed portion 2 to lock said ring in adjusted position. In use the screws 16 secure the head and bed together and the nut 19 upon stem 18 binds said head upon the tool or tools carried in the bed. In the recess 10 a cut-off blade 34 may be received and retained for operation and in either or both recesses 11 tools may be carried.

An external threader or like tool may be received in the recess 9, a boring tool or internal threader 21 may be received in the recesses 4, 14 as may an end mill or reamer 22. A rough cutting tool 35 and a finishing or dressing tool 36 may be received in the recesses 7, 8 and operated together so that two operations are performed upon the stock simultaneously. The holder is secured in adjusted position in the lathe by turning the adjusting ring 31 down into secure frictional engagement with the lathe as shown in Fig. 9. To change this adjustment the ring is raised by rotation clear of the lathe, the screw 33 having been loosened. By manually grasping the head and bed, the nut 19 having been loosened, they are oscillated as a unit to cause the index fingers to move from notches 6 in which they are yieldingly retained to the next pair of notches which are ninety degrees removed therefrom to give the holder one-quarter turn adjustment, or from the position shown in full lines to that shown dotted in Fig. 8. The ring 31 is now tightened in the lathe again and another tool is ready for work.

Obviously the tool holder may be swung or adjusted one quarter, one-half way, three quarters, or completely turned around to bring into position the particular tool or tools desired, or adjustment to any intermediate position may be had and this adjustment may be to the right or left, intermediate positions being held by the index fingers in frictional engagement with the wall of the central perforation 5. The holder may be positioned upon the lathe carriage either to one side or in direct line of the work 37. When a boring tool, as an example, is to be used the tool may be supported in direct line with the work so that there is no lateral pull and the compact close assembly of the holder provides a very positive support for the tool, eliminating strain, play and danger of tool breakage. In Figs. 3 and 6 a forty-five degree slot 38 is shown. To provide for same two screw perforations 15 and wells 11b are omitted, said slot 38 receiving tools such as form cutters of different lengths and of one piece or multi-piece formation.

Figure 11:
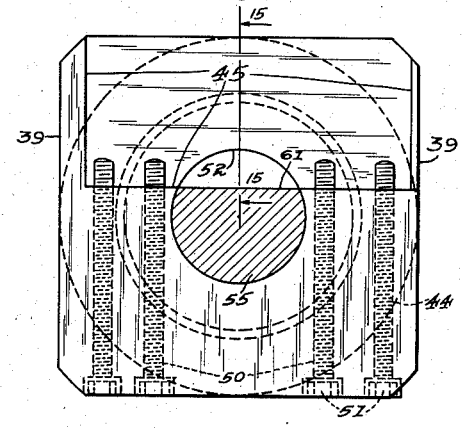
Fig. 11 is an horizontal cross sectional view through the tool holder taken on the line 11—11 of Fig. 12.
Figure 12:
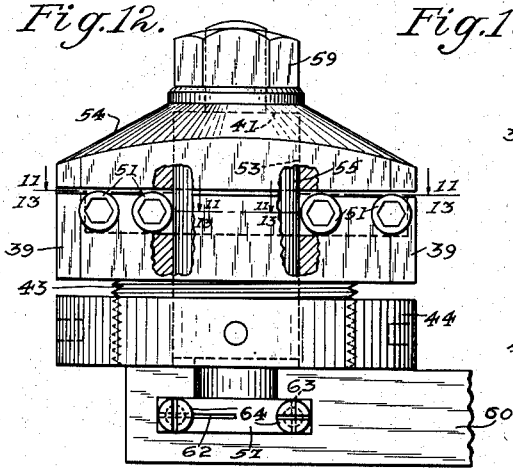
Fig. 12 is a view of the tool shown in Fig. 10 in elevation and partly in section applied to the carriage of a lathe.
Figure 13:
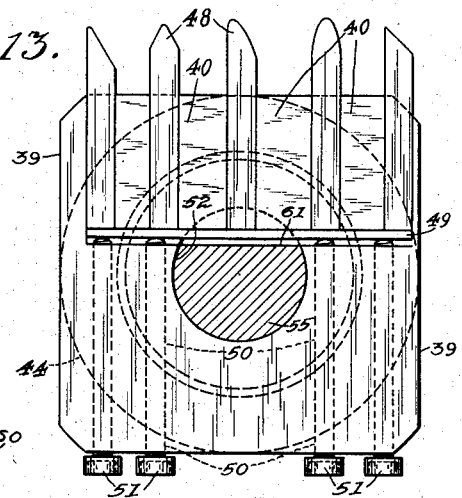
Fig. 13 is a view partly in plan and partly in cross section on the line 13—13 of Fig. 12 provided with a plurality of tools.
Figures 14, 15:
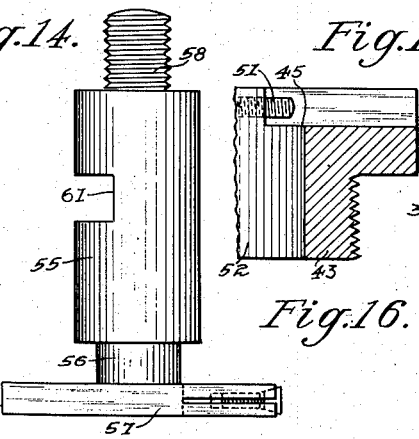
Fig. 14 is a view in elevation of the standard employed.
Fig. 15 is a vertical sectional view through Fig. 11 on the line 15—15 thereof.
Figure 16:
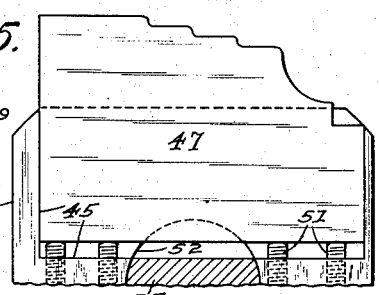
Fig. 16 is a fragmentary view of Fig. 11 partly in section and provided with a cutting tool.

Referring now to Figs. 10 to 16 inclusive, the bed 39 is integral with a threaded stud 43 that carries the adjusting ring 44. The top face of the bed 39 is formed with the horizontal tool-receiving recess 45 that receives tools 46, 47 or 48 or the like which when in position may abut the base of said recess or which may abut a spacer plate 49 co-extensive with the recess base-wall. The bed 39 is formed, further, with a plurality of screw-receiving interiorly threaded perforations 50 through which the screws 51 extend into the recess 45 to engage and space outwardly a tool 46 or 47 or the plate 49 to force the several tools 48 outwardly simultaneously for engagement with the work. The small tools 48 are spaced apart by spacer blocks 48 placed between them. The bed 39 is formed centrally with a round perforation 52 that extends through the stud 43 and with a perforation 53 in the head 54, said perforation 53 being reduced at one end to form the shoulder 41.

A standard 55 round in cross section is formed with a reduced lower portion 56 that terminates in a foot 57 and with a reduced threaded upper portion 58, the body portion of said standard extending through said stud 43 and into the head perforation 53 with the upper end of said body portion abutting the shoulder 41, the threaded portion 58 extending through the reduced part of the head bore and thereabove to receive the nut 59. The reduced portion 56 of said standard together with the foot 57 are adjustably received in the carriage of the lathe 60, said standard being formed with a recess 61 that registers with the bed recess 45, the base of the recess 45 being flush with that of the standard recess 61. The foot 57 is formed with horizontal and vertical slots 62, 63 respectively in one end, threaded to receive the screws 64 that, when driven slightly into their respective slots expand the slotted end of the resilient foot to lock it firmly in an adjusted position in the lathe. The several tools 46, 47, 48 when in position in the bed 39 rise slightly above the topmost edge of the recess 45 so that the head 54 may be clamped tightly thereupon by means of the nut 59 to secure them firmly in operative position for engagement with the work.

What is claimed is:

1. In a combination tool holder for lathes, a standard, a head carried thereby, a bed adapted for rotation about said standard releasably secured to said head, said bed and head being movable manually as an unit, said bed being formed with recesses extending completely thereacross to receive tools, index fingers arranged in said standard for yielding locking engagement with said bed, and means for locking said bed to a lathe.

2. In a combination tool holder for lathes, a perforated standard terminating at one end in a threaded stem, a nut upon said stem, a foot at the opposite end of said standard, a head arranged upon said standard for engagement by said nut, a tool-carrying bed arranged upon said standard for movement thereabout, screws connecting said head and bed, said bed being formed with a reduced threaded portion, means carried by said standard in a perforated portion thereof for yielding frictional locking engagement with said bed, an operating ring arranged upon said reduced bed portion, and a screw carried by said ring for engagement with the threads of said reduced bed portion.

3. In a combination tool holder for lathes, a perforated standard terminating in a threaded stem, a nut upon said stem, a foot at one end of said standard, a head arranged upon said standard for engagement by said nut, a tool-carrying bed having a perforated notched portion of substantially greater diameter than said standard receiving same, said bed being formed with a reduced threaded portion, index fingers arranged in a perforation in said standard, a thrust spring connecting said fingers and yieldingly disposing them against the wall of the perforated and notched portions of said bed, screws connecting said bed and head, and a threaded ring upon the reduced portion of said bed.

SAMUEL STROBL.